United States Patent [19]
Haneda et al.

[11] Patent Number: 5,900,848
[45] Date of Patent: May 4, 1999

[54] INFORMATION PROCESSING APPARATUS

[75] Inventors: Isamu Haneda, Soraku-gun; Toshio Isoe, Tenri, both of Japan

[73] Assignee: Sharp Kabushiki Kaisha, Osaka, Japan

[21] Appl. No.: 08/827,609

[22] Filed: Apr. 9, 1997

[30] Foreign Application Priority Data

May 17, 1996 [JP] Japan ................................. 8-123039

[51] Int. Cl.⁶ .................................................. H01R 39/00
[52] U.S. Cl. .................................. 345/1; 345/5; 345/102; 361/681; 364/708.1; 364/709.1
[58] Field of Search .............................. 345/1, 3, 5, 102, 345/104; 361/681; 364/708.1, 709.01, 709.1

[56] References Cited

U.S. PATENT DOCUMENTS

| | | | |
|---|---|---|---|
| 4,542,903 | 9/1985 | Yokoi et al. | 463/31 |
| 4,842,378 | 6/1989 | Flasck et al. | 349/70 |
| 4,945,348 | 7/1990 | Ibamoto et al. | 345/104 |
| 5,091,876 | 2/1992 | Kumano et al. | 364/419 |
| 5,224,060 | 6/1993 | Ma | 364/708 |
| 5,337,212 | 8/1994 | Bartlett et al. | 361/681 |
| 5,345,362 | 9/1994 | Winkler | 361/681 |
| 5,383,138 | 1/1995 | Motoyoama et al. | 364/708.1 |
| 5,467,102 | 11/1995 | Kuno et al. . | |
| 5,494,447 | 2/1996 | Zaidan | 439/31 |
| 5,508,713 | 4/1996 | Okouchi | 345/1 |
| 5,600,580 | 2/1997 | Honjo et al. | 346/708.1 |
| 5,644,469 | 7/1997 | Shioya et al. | 361/681 |

FOREIGN PATENT DOCUMENTS

| | | |
|---|---|---|
| 0454120A2 | 10/1991 | European Pat. Off. . |
| 0458316A2 | 11/1991 | European Pat. Off. . |
| 0626632A1 | 11/1994 | European Pat. Off. . |
| 0645726A2 | 3/1995 | European Pat. Off. . |
| 9406985U1 | 8/1995 | Germany . |
| 2127714 | 5/1990 | Japan . |
| 5165547 | 7/1993 | Japan . |
| 6161600 | 6/1994 | Japan . |
| 6324760 | 11/1994 | Japan . |
| 9524007 | 9/1995 | WIPO . |

*Primary Examiner*—Mark K. Zimmerman
*Assistant Examiner*—Vincent E. Kovalick

[57] ABSTRACT

An information processing apparatus having a main body and a lid body is configured so that the lid body can be switched between a closed state, a stacked state, a double screen state and an inverted state. Each of the main body and the lid body has a display section for displaying information and an input section composed of a transparent tablet and provided on the display section. As a sensor or the like detects the lid body in one of the four states, a control section of the information processing apparatus controls the display section so that a screen on the display section is appropriate to the detected state of the lid body. The control section also controls the lighting section for lighting the display section appropriately to the detected state of the lid body. This realizes appropriate display in accordance with usages of the information processing apparatus and offers an easy-to-operate and easy-to-use information processing apparatus. Besides, the lighting section is turned on/off according to needs, and therefore it is possible to prevent heat generation and to restrain power consumption.

14 Claims, 19 Drawing Sheets

FIG. 8 (a)
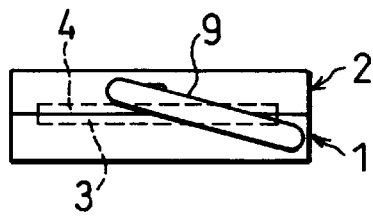
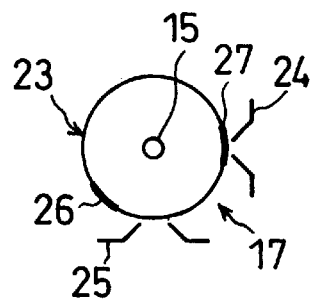
FIG. 8 (b)
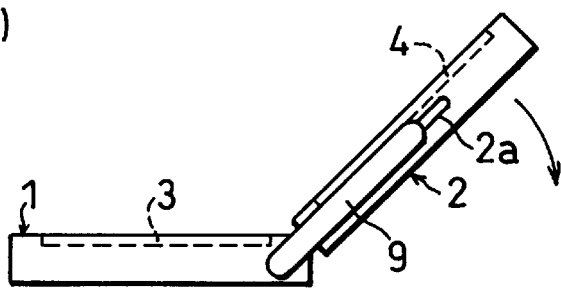
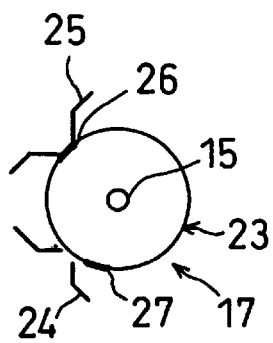
FIG. 8 (c)
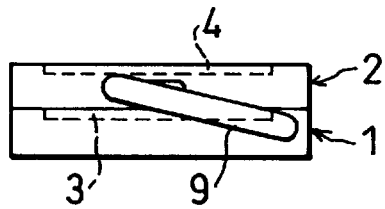
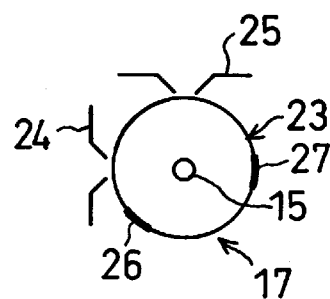
FIG. 8 (d)
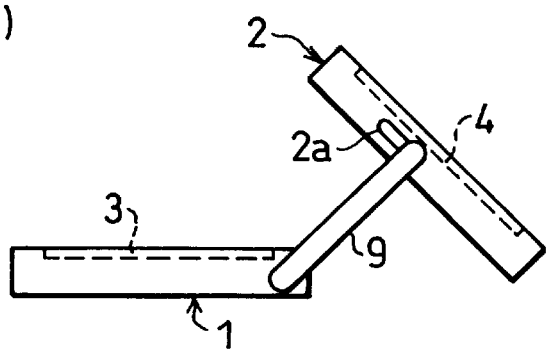
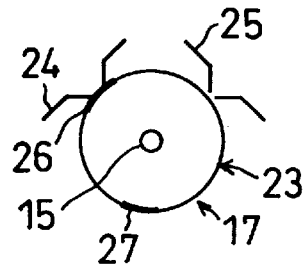

FIG. 11(a)

| TELEPHONE DIRECTORY | | NEW |
|---|---|---|
| NAME | TELEPHONE NUMBER | FAX NUMBER |
| AIDA JIRO | 07435-2-2151 | 07435-3-3454 |
| ⋮ | ⋮ | ⋮ |
| ⋮ | ⋮ | ⋮ |
| ⋮ | ⋮ | ⋮ |
| ⋮ | ⋮ | ⋮ |
| YAMADA ICHIRO | 03-3376-2153 | 03-3376-3985 |
| ⋮ | ⋮ | ⋮ |
| ⋮ | ⋮ | ⋮ |

| NAME | YAMADA ICHIRO |
|---|---|
| TELEPHONE NUMBER | 03-3376-2153 |
| FAX NUMBER | 03-3376-3985 |
| ADDRESS | ... SHINJUKU, TOKYO |
| ZIP CODE | 160 |
| BIRTHDAY | OCTOBER 20, 1970 |
| MEMO | |

FIG. 11(b)

| | | |
|---|---|---|
| TELEPHONE DIRECTORY | SAVE | STOP |

YAMADA ICHIRO

| ADDRESS | ... SHINJUKU, TOKYO |
|---|---|
| ZIP CODE | 160 |
| BIRTHDAY | OCTOBER 20, 1970 |
| MEMO | |

HAND-WRITTEN CHARACTER RECOGNITION BOARD

| | | | | CHARACTER |
|---|---|---|---|---|
| | | | | NUMERAL |
| | | | | SYMBOL |

INFORMATION PROCESSING APPARATUS

FIELD OF THE INVENTION

The present invention relates to an information processing apparatus having a plurality of screens equipped with input functions such as pen input and touch input.

BACKGROUND OF THE INVENTION

A conventional information processing apparatus includes a display device having two screens with a function to display information and a touch panel function to input information. An example of such an apparatus is disclosed in Japanese Laid-Open Patent Application No. 2-127714/1990 (Tokukaihei 2-127714). The apparatus is an electronic equipment (e.g., a personal computer) that has two touch panels, instead of one, using a liquid crystal display device (LCD device) and the like in lieu of a conventional fixed input keyboard.

Japanese Laid-Open Patent Application No. 5-165547/1993 (Tokukaihei 5-165547) describes an apparatus having a keyboard attached to the main body and a touch panel-cum-display section attached on the back side of the lid body. The lid body can be switched from a closed state to an open state and further switched to a stacked state. In the stacked state, the lid body is laid on the main body so that the display section of the lid body section faces upwards, and pen input and touch input are possible with the touch panel of the lid body.

However, a conventional display section, such as an LCD, with an input function needs a lighting section such as a backlight. Therefore, if the main body has that kind of display section (e.g., a device described in Japanese Laid-Open Patent Application No. 5-165547/1993), and the lid body is positioned in the stacked state, heat of the display section of the main body does not escape and affects its crystal liquid screen. Also, power is wasted, because the lighting is not turned off although the display section of the main body cannot be seen. An operation is necessary to turn on/off the backlight of the display section of the main body according to states of the lid body, adding a complication to operations.

When the lid body is moved into the stacked state, and the "double screens" are changed into the "single screen", the display state of the display sections are not changed, and therefore the information displayed on the displayed section of the main body cannot be seen. Especially, when an input is being performed with the display section of the main body, an operation is necessary to transfer the information displayed on the display section of the main body to the display section of the lid body, adding a complication to operations.

Incidentally, portable information processing apparatuses are often used for presentation and the like. When the user wants to show the screen of the display section to another person, the user must turn around the whole apparatus. Otherwise the other person must stand behind the user to look at the screen. This is very inconvenient. When the user wants to see where the other person is pointing at on the screen, the user must stand behind the other person to look at the screen. This is also very inconvenient. Japanese Laid-Open Patent Application No. 6-161600/1994 (Tokukaihei 6-161600) discloses an apparatus having a screen which can be turned around to face backward without changing the position of the main body, and which can also turn the screen display upside down. However, the apparatus has only one screen, which is inconvenient when two persons need to look at the single screen at the same time.

SUMMARY OF THE INVENTION

An object of the present invention is to offer an information processing apparatus capable of restraining heat generation and power consumption when a various kinds of display are carried out by making use of a plurality of display sections.

An information processing apparatus in accordance with the present invention has a main body and a lid body, each of the main body and the lid body having a display section for displaying information and a lighting section for lighting the display section, and in order to accomplish the above object, includes:

connecting section for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting section for detecting in which of the three states the lid body is; and control section for controlling a lighting state of the lighting section of the main body and a lighting state of the lighting section of the lid body according to a result detected by the lid body detecting section.

The information processing apparatus can produce an appropriate lighting state by detecting the state of the lid body with the lid body detecting section, and controlling the lighting state of the lighting sections of the main body and the lid body with control section accordingly to a result detected by the lid body detecting section.

The information processing apparatus can be configured, for example, so that the lighting for the display section of the main body is OFF when the lid body is in the stacked state, and the lighting for the display section of the main body can be automatically turned on when the lid body is in the double screen state. This can save power consumption of the information processing apparatus. Additionally, this can prevent heat from being accumulated in the display section of the main body, thereby protecting the display sections of the main body and the lid body from heat.

Another object of the present invention is to offer an information processing apparatus that can be easily operated by appropriately changing display state accordingly to the usage of the lid body when a various kinds of display are carried out by making use of a plurality of display sections.

An information processing apparatus in accordance with the present invention has a main body and a lid body, each of the main body and the lid body having a display section for displaying information, and in order to accomplish the above object, includes:

connecting section for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting section for detecting in which of the three states the lid body is; and control section for controlling a display state of the display section of the main body and a display state of the display section of the lid body according to a result detected by the lid body detecting section.

The information processing apparatus can produce an appropriate display state by detecting the state of the lid body with the lid body detecting section, and controlling the display stated of the display sections of the main body and the lid body with control section accordingly to a result detected by the lid body detecting section.

For example, when the lid body is moved into the stacked state, the information processing apparatus can give a priority to information of the display section of the main body or of the lid body which includes the cursor and automatically display all that information on the display section of the lid body. This, even when the display section of the main body is being used for an input operation, eliminates a need for an operation of scrolling the cursor from an input position of the display section of the main body onto the display section of the lid body. Therefore, even when display on the display sections of the main body and the lid body is changed, the input position can be shown clearly, thereby offering a user-friendly display environment.

A preferred embodiment of an information processing apparatus in accordance with the present invention has a main body and a lid body, each of the main body and the lid body having a display section for displaying information, and includes:

connecting section for connecting the lid body to the main body so that the lid body can be switched into an inverted state where the display section of the main body is visible and the display section of the lid body is inverted on the backside of the main body;

lid body detecting section for detecting that the lid body is in the inverted state; and control section for, when the lid body detecting section detects that the lid body is in the inverted state, controlling so that the display section of the main body and the display section of the lid body display the same information and so that the display section of the lid body displays the information upside down.

The information processing apparatus, when the lid body is moved into the inverted state, can perform display which can be recognized easily by a person sitting opposite the user by displaying the same information on the display section of the lid body as the information on the display section of the main body, and turning upside down the display on the display section of the lid body. Besides, the user only needs to operate so that the lid body is switched to the inverted state, which facilitates presentation by the user to another person opposite him.

For a fuller understanding of the nature and advantages of the invention, reference should be made to the ensuing detailed description taken in conjunction with the accompanying drawings.

BRIEF DESCRIPTION OF THE DRAWINGS

FIGS. 8(a) are a side view showing relative positions of the main body and the lid body and an enlarged view showing a lid body sensor in the closed state.

FIGS. 8(b) are a side view showing relative positions of the main body and the lid body and an enlarged view showing a lid body sensor in the double screen state.

FIGS. 8(c) are a side view showing relative positions of the main body and the lid body and an enlarged view showing a lid body sensor in the stacked state.

FIGS. 8(d) are a side view showing relative positions of the main body and the lid body and an enlarged view showing a lid body sensor in the inverted state.

FIG. 11(a) is a plane view showing an example of the display screen in the double screen state.

FIG. 11(b) is a plane view showing an example of the display screen when the display shown in FIG. 11(a) is switched to the stacked state.

FIG. 18 (b) is a plan view showing a display screen of the lid body display section when display is performed in the inverted state in both Japanese and English.

DESCRIPTION OF THE EMBODIMENTS

The following description will discuss an embodiment of the present invention.

Figure 3:
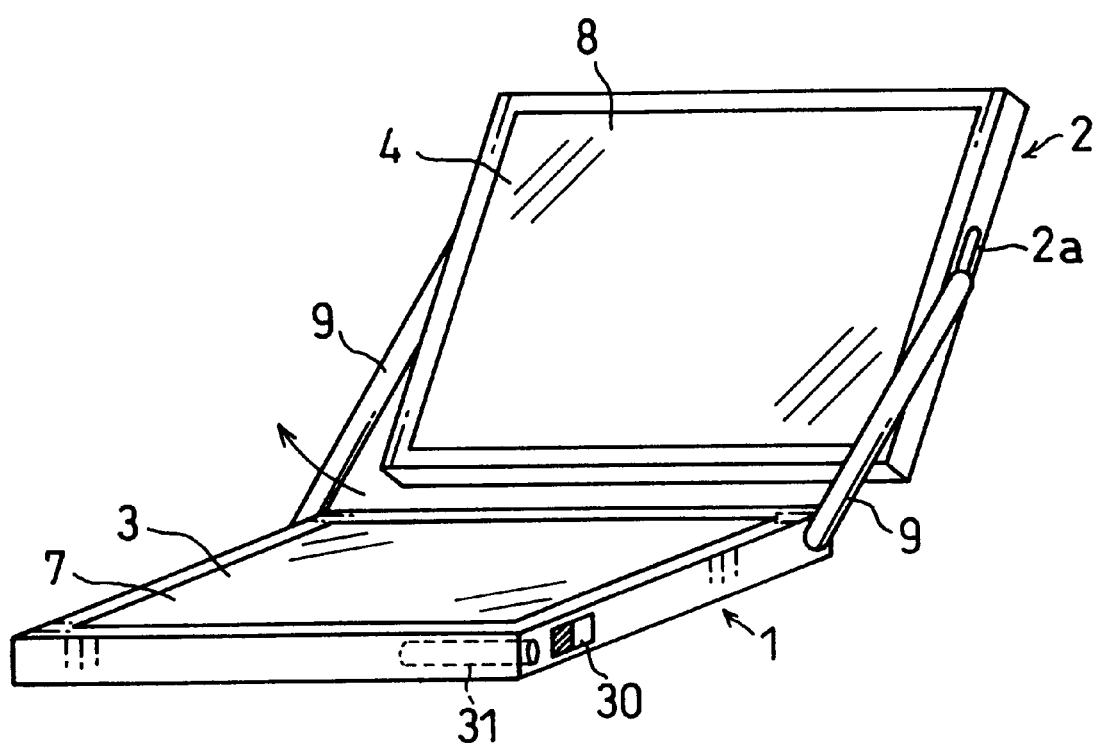
FIG. 3 is a perspective view showing an appearance of the information processing apparatus in a double screen state.

An information processing apparatus of the present embodiment, as shown in FIG. 3, has a structure for opening and closing a lid body 2 with rotatable arms 9 (connecting means) attached to rear portions of a main body 1. The lid body 2 is provided so as to be freely rotatable with respect to the rotatable arms 9, and, as will be discussed later, can be switched between four states: a closed state, a double screen state, a stacked state and an inverted state. The main body 1 includes a main body display section (a display section of the main body) 3 for displaying information, a main body lighting section (a lighting section of the main body) 5 (see FIG. 1) for lighting the main body display section 3, and a main body input section 7 as input means for carrying out an input operation on the main body display section 3. The lid body 2 includes a lid body display section (a display section of the lid body) 4 for displaying information, a lid body lighting section (a lighting section of the lid body) 6 (see FIG. 1) for lighting the lid body display section 4, and a lid body input section 8 as input means for carrying out an input operation on the lid body display section 4.

The main body display section 3 and the lid body display section 4 are plane type display devices such as a plasma display device and a liquid crystal display device (LCD device). Here, LCD devices are used. The main body display section 3 is provided on the upper surface of the main body 1, while the lid body display section 4 is provided on the inner surface of the lid body 2 ("inner" when in the closed state). The main body lighting section 5 and the lid body lighting section 6 for lighting the main body display section 3 and the lid body display section 4 are backlights provided inside the main body 1 and lid body 2 respectively. The main body input section 7 and the lid body input section 8 are touch panels, for touch input and pen input, which have transparent tablets mounted on the surfaces of the main body display section 3 and the lid body display section 4 respectively.

The rotatable arms 9 are connected at their base ends to the rear portions of the right and left side surfaces of the main body 1 so as to freely rotate around the base ends, and are connected at their pointed ends to link bodies (not shown) attached so as to freely slide along slide grooves 2a on the right and left portions of the lid body 2 so as to freely rotate around the pointed ends. As a result, the rotatable arms 9 are rotatable with respect to the main body 1, and the lid body 2 is both rotatable and slidable with respect to the rotatable arms 9. A shaft 14 (see FIG. 7(a)) is provided in a protruding manner at the base ends of the rotatable arms 9, and supported by the main body 1 via a bush. A shaft 15 (see FIG. 8(a)) is provided in a protruding manner at the pointed ends of the rotatable arms 9, and supported by the link body of the lid body 2 via a bush. As a result, the rotatable arms 9 can be held in any angle, using friction between the shafts 14 and 15 and the bushes.

A purpose of arranging the lid body 2 to be slidable with respect to the rotatable arms 9, is to prevent the main body 1 from interfering with rotation of the lid body 2. The mechanism of sliding the rotatable arms 9 is unnecessary if the rotatable arms 9 are made to be freely adjustable in length. Another structure for eliminating such a mechanism of sliding the rotatable arms 9 is to provide a notch on the back of the main body 1 so as to prevent the main body 1 from interfering with rotation of the lid body 2.

Figure 4:
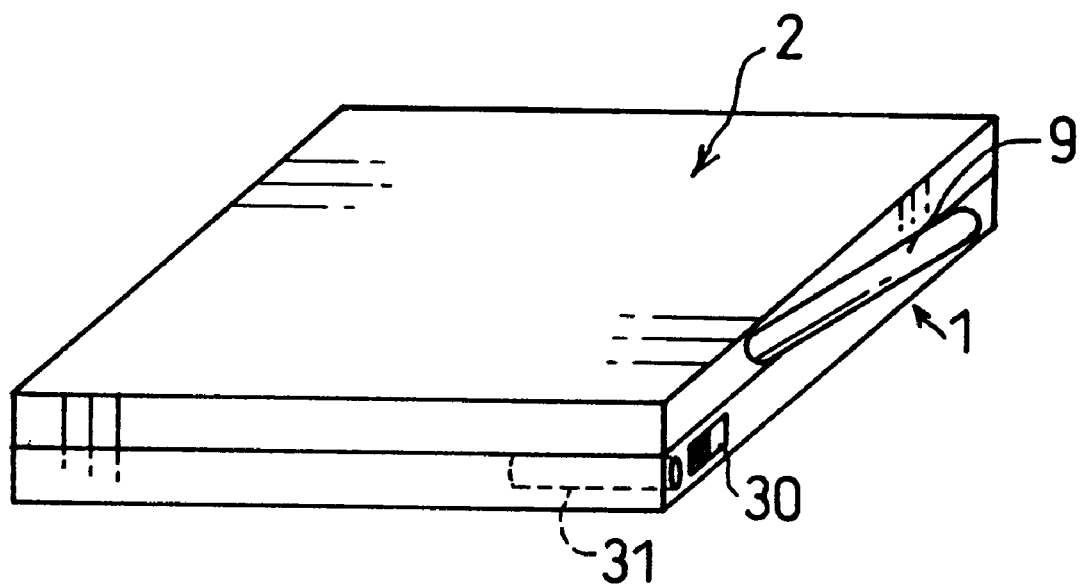
FIG. 4 is a perspective view showing an appearance of the information processing apparatus in a closed state.
Figure 5:
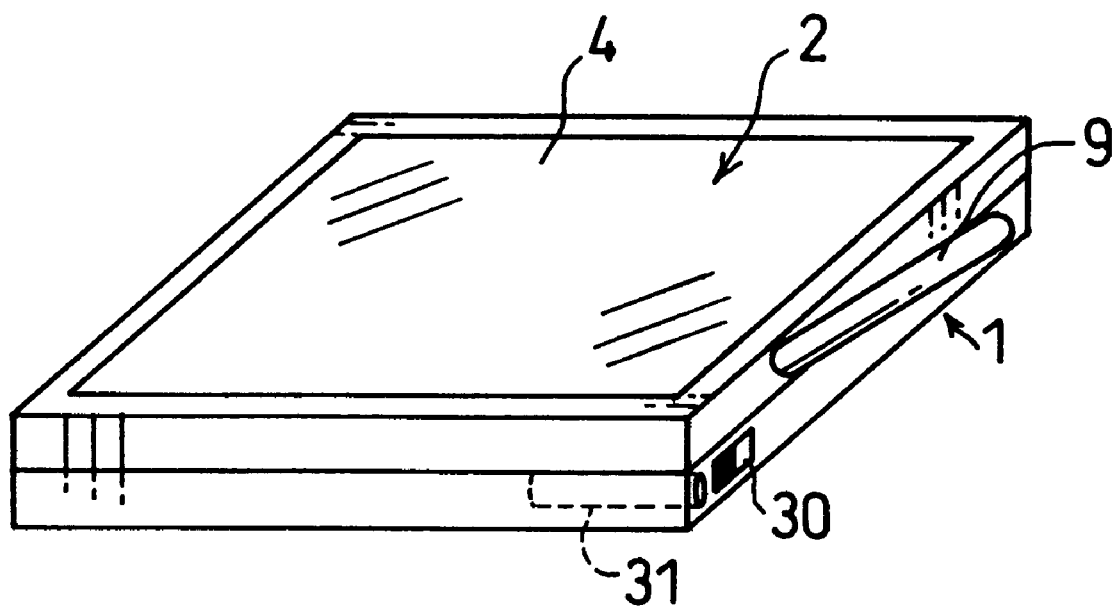
FIG. 5 is a perspective view showing an appearance of the information processing apparatus in a stacked state.
Figure 6:
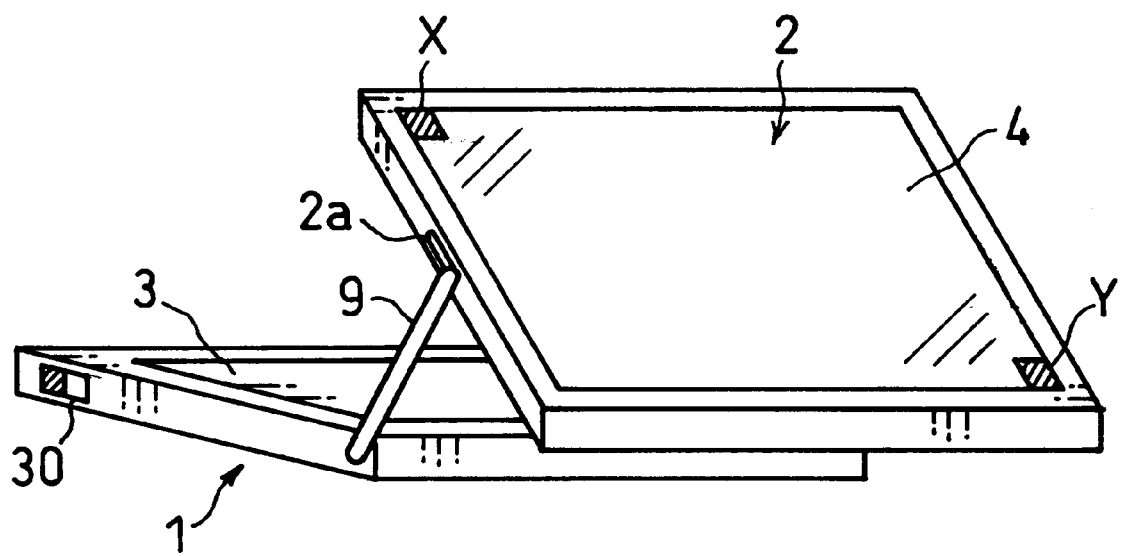
FIG. 6 is a perspective view showing an appearance of the information processing apparatus in an inverted state.

Any of the arrangements may be adopted to switch the lid body 2 between the four states: the closed state where the lid body 2 covers the main body 1 with the lid body display section 4 facing downward as shown in FIG. 4, the stacked state where the lid body 2 is stacked on the main body 1 with the lid body display section 4 facing upward as shown in FIG. 5, the double screen state where both the main body display section 3 and the lid body display section 4 are visible as shown in FIG. 3, and the inverted state where the lid body display section 4 is inverted on the back side of the main body 1 as shown in FIG. 6. The main body 1 has a power source switch 30 and a pen holder 31 for holding a pen used for hand-writing input through the tablets of the main body input section 7 and the lid body input section 8.

Figure 1:
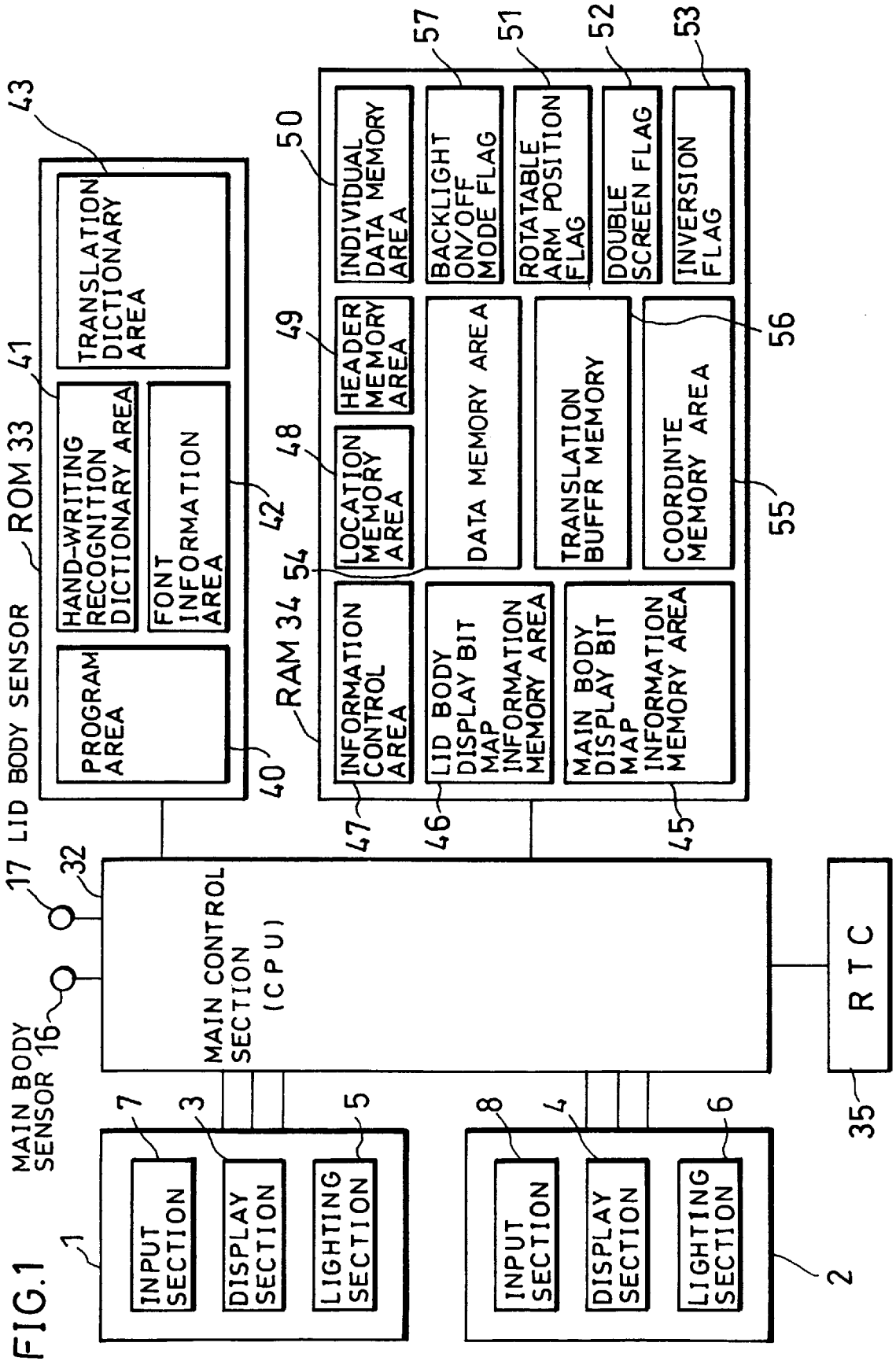
FIG. 1, illustrating an embodiment of the present invention, is a block diagram showing a configuration of a main part of an information processing apparatus.

In the main body 1 are provided, as shown in FIG. 1, control means composed of a main control section 32, an ROM 33, an RAM 34, a real time clock (RTC) 35 and an I/O port; an interface; circuits such as the display sections 3 and 4, and the lighting sections 5 and 6; and a power source section for providing a rated-voltage power supply to the control means. Cables connecting the circuits of the main body 1 to those of the lid body 2 run in the rotatable arm 9.

The information processing apparatus has lid body detecting means for detecting the states of the lid body 2. The lid body detecting means is composed of a main body sensor 16, shown in FIGS. 7(a) through 7(c), for detecting rotation of the rotatable arms 9 with respect to the main body 1 and a lid body sensor 17 for detecting rotation of the lid body 2 with respect to the rotatable arms 9 as shown in FIGS. 8(a) through 8(c).

Figure 7A:
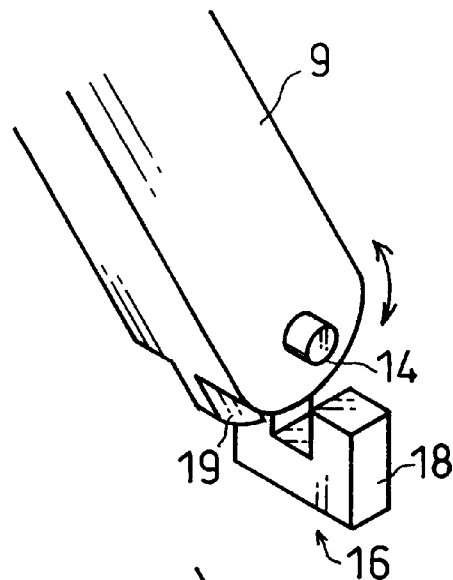
FIG. 7(a) is a perspective view showing a main body sensor using an opposing type light sensor.

The main body sensor 16 includes an opposing type light sensor 18, such as a photointerrupter, provided to the main body 1 near the base ends of the rotatable arms 9 as shown in FIG. 7(a). The opposing type light sensor 18 is turned on/off depending upon whether or not a protrusion 19 provided in a protruding manner at the base end of the rotatable arm 9 blocks light of the opposing type light sensor 18. That is, when the lid body 2 is in the stacked or closed state, the protrusion 19 of the rotatable arm 9 blocks the light, and the opposing type light sensor 18 detects the blockage of the light and turns on.

Figure 7B:
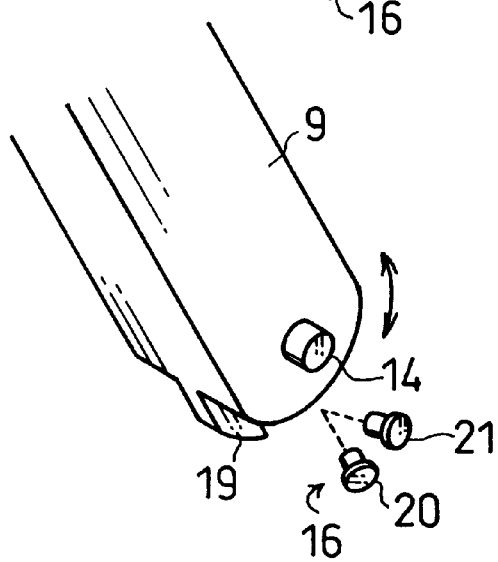
FIG. 7(b) is a perspective view showing a main body sensor using a reflection type light sensor.

Another example of the main body sensor 16, as shown in FIG. 7(b), is a reflection type light sensor which is a combination of a light emitting diode (LED) 20 and a phototransistor 21. Reflective agent is applied to the protrusion 19 of the rotatable arm 9. Light irradiated by the LED 20 is reflected by the protrusion 19, and the reflected light is detected by and turns on the phototransistor 21.

Figure 7C:
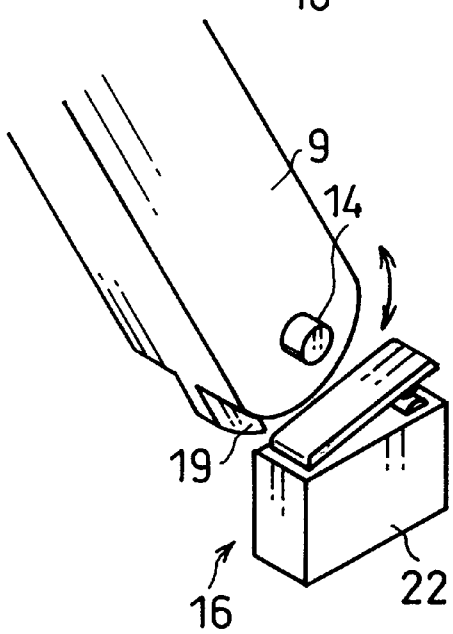
FIG. 7(c) is a perspective view showing a main body sensor using a micro switch.

These two examples of the main body sensor 16 are non-contact switches. FIG. 7(c) shows a contact switch using a micro switch 22. The protrusion 19 of the rotatable arm 9 contacts and turns on the micro switch 22.

The lid body sensor 17, as shown in FIGS. 8(a) through 8 (d), is composed of an isolating body 23 of a disc shape disposed around the shaft 15 at the pointed end of the rotatable arm 9, an "A" switch 24 and a "B" switch 25 provided to a link body of the lid body 2 along the outer periphery of the isolating body 23, and conductive bodies 26 and 27 attached respectively to the higher front portion and the lower front portion of the outer periphery of the isolating body 23. The B switch 25 is disposed to the lid body 2 near the lid body display section 4, whereas the A switch 24 is disposed 90 degrees behind the B switch 25 clockwise. The A switch 24 and the B switch 25 are turned on as coming into contact with the conducting bodies 26 and 27 respectively.

The A switch 24 is turned on either when the lid body 2 is in the inverted state and in contact with the conductive body 26 as shown in FIG. 8(d) or when the lid body 2 is in the closed state and in contact with the conductive body 27 as shown in FIG. 8(a). The B switch 25 is turned on either when the lid body 2 is in the double screen state and in contact with the conductive body 26 as shown in FIG. 8(b), or when the lid body 2 is in the closed state and in contact with the conductive body 27 as shown in FIG. 8(a). Both the A switch 24 and the B switch 25 are turned off when the lid body 2 is in the stacked state as shown in FIG. 8(c).

The states of the lid body 2 can be detected with outputs from the two sensors 16 and 17. That is, the switch of the main body and the A switch 27 are ON in the closed state; the switch of the main body is OFF and the B switch 25 is ON in the double screen state; the switch of the main body is ON and the A switch 24 and the B switch 25 are ON in the stacked state; and the switch of the main body is OFF and the A switch 24 is ON in the inverted state.

In the present embodiment, the lid body sensor 17 has the isolating body 23 disposed with the rotatable arm 9, and the A switch 24 and the B switch 25 disposed with the lid body 2. However, the lid body sensor 17 may have the isolating body 23 disposed with the lid body 2, and the A switch 24 and the B switch 25 disposed with the rotatable arm 9.

FIG. 1 shows a control block diagram of the information processing apparatus configured as above. The main control section 32 composed of a CPU has both new and old functions. Examples of the old functions include a function to process information inputted, for example, through touches and hand-written characters, and then display results as information on the main body display section 3 or lid body display section 4, a function to always follow the cursor location, and a function to translate a language into another language. An example of the new functions is a function to control a display state and a lighting state according to the states of the lid body 2. The main control section 32 thereby functions as control means and cursor location detecting means as defined in claim.

The RTC 35 is for measuring time in accordance with clock signals and outputs the present time. The ROM 33 is formed by a program area 40 for storing various programs with which the main control section 32 controls various sections, a hand-writing recognition dictionary area 41 for storing a dictionary to recognize hand-written characters, a font information area 42 for storing character fonts displayed on the main body display section 3 and the lid body display section 4, and a translation dictionary area 43.

The RAM 34 is formed by a data storing area (not shown) for storing information inputted by the user, a main body display bit map information memory area 45 and a lid body display bit map information memory area 46 for storing displays of the main body display section 3 and the lid body display section 4 in advance when the lid body 2 is stacked on the main body 1, an information control area 47 for controlling functions currently in use, a location memory area 48 for holding cursor location information, a header memory area 49 for holding a header currently in use, an individual data memory area 50 for holding kinds of data of functions currently in use, a rotatable arm position flag 51 for representing the position of the rotatable arm 9, a double screen flag 52 for representing the position of the lid body when the two screens are being used for display, an inversion flag 53 for representing the position of the lid body when the lid body 2 is in the inverted state, a data memory area 54 for storing data, a coordinate memory area 55, a translation buffer memory 56 and a backlight ON/OFF mode flag 57.

Translation means as defined in claim is formed by the main control section 32, the ROM 33 and the RAM 34.

Figure 2:
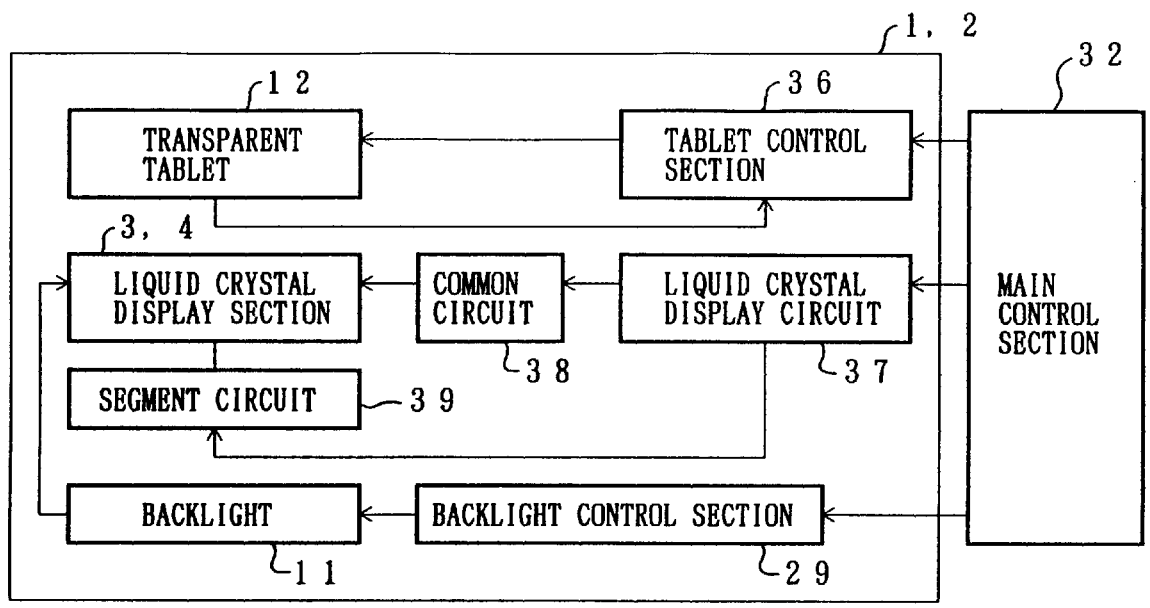
FIG. 2 is a block diagram showing a configuration of a main part of a main body and a lid body of the information processing apparatus.

FIG. 2 shows a configuration of the main body 1 and the lid body 2 in more detail. A tablet control section 36 is for obtaining coordinate information from transparent tablets 12 of the main body input section 7 and the lid body input section 8. The tablet control section 36 is connected to a transparent electrode section provided to one of two transparent sheets of the tablet 12 and to a transparent electrode section provided to the other transparent sheet of the tablet 12, and detects the coordinate information as the two transparent electrode sections are brought into contact with each other at the location indicated at with a pen or a finger. Note that the tablet control section 36 corresponds to the location detecting means described in claim.

A liquid crystal display circuit 37 is for controlling a common circuit 38 and a segment circuit 39. The liquid crystal display circuit 37 stores, as bit maps, dot locations where a dot matrix of the main body display section 3 or the lid body display section 4 that are liquid crystal display devices is to be turned on, and sends information on the bit maps to the common circuit 38 and the segment circuit 39, so as to display the liquid crystal dot matrix of the main body display section 3 or the lid body display section 4. A backlight control section 29 controls turning on/off of a backlight 11 used for the main body lighting section 5 or the lid body lighting section 6. So as to the configuration described so far, the main body 1 and the lid body 2 have the same configuration.

Figure 9:
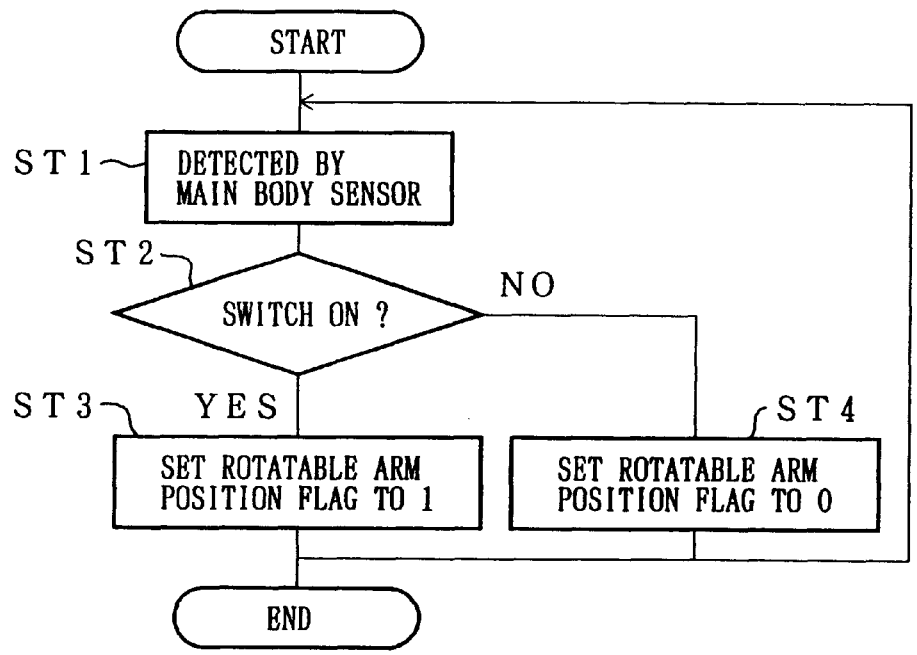
FIG. 9 is a flow chart showing a process of detecting positions of a rotatable arm.

The following description will explain a process of detecting a state of the lid body 2 when the lid body 2 has been rotated and changed its state. Reference is made to FIG. 9 about the position of the rotatable arm 9. The main body sensor 16 detects a movement of the protrusion 19 of the rotatable arm 9 in step 1 (hereinafter, "step" will be abbreviated as ST) and judges in ST 2 whether the switch of the main body is turned on or off. When the rotatable arm 9 rotates, and the main body sensor 16 detects a movement of the protrusion 19, the switch is turned on as already discussed. Then a rotatable arm position flag 51 is set to "1" in ST 3. If the movement of the protrusion 19 is not detected, that is, if the switch is turned off, the rotatable arm position flag 51 is set to "0" in ST 4. It can be judged from this output from the main body sensor 16 whether the lid body is in either the double screen state or the inverted state or in either the closed state or the stacked state.

Figure 10:
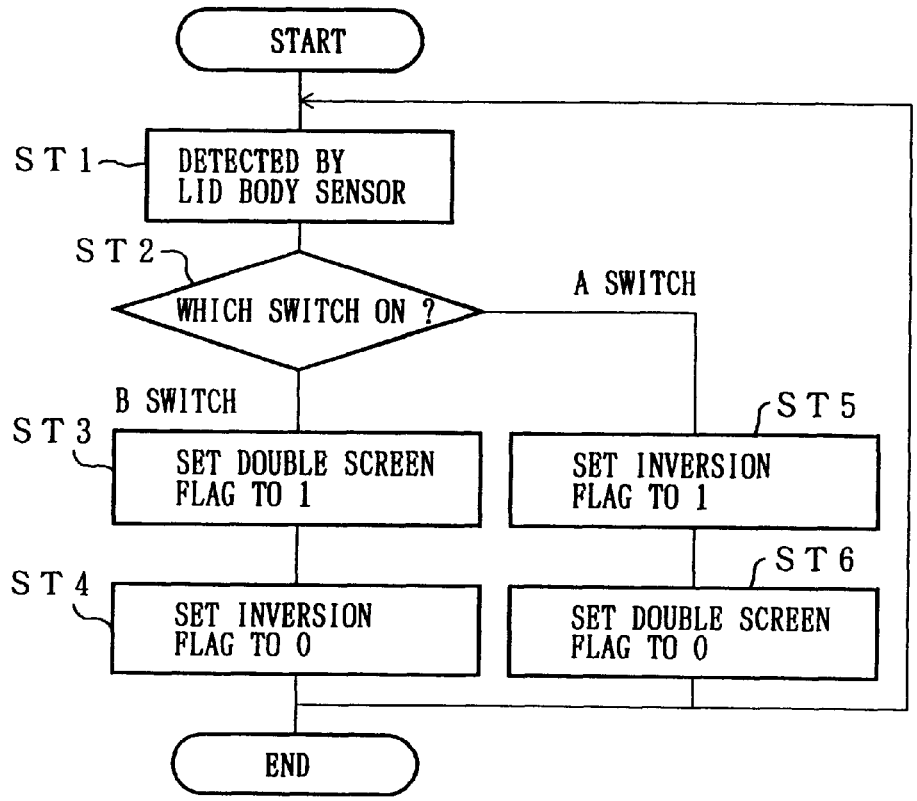
FIG. 10 is a flow chart showing a process of detecting rotation of the lid body.

As to the position of the lid body 2, the following process is carried out when the rotatable arm position flag 51 is 0. Referring to FIG. 10, the states of the A switch 24 and the B switch 25 of the lid body sensor 17 are detected in ST 1, and it is judged in ST 2 whether the A switch 24 and the B switch 25 are ON or OFF. Since the B switch 25 is ON in the double screen state, a double screen flag 52 is set to 1 in ST 3, and an inversion flag 53 is set to 0 in ST 4.

Suppose that the lid body 2 is rotated into the inverted state so as to face straightly toward another person opposite the user. As the lid body 2 is rotated, the conductive body 26 comes in contact with and turns on the A switch 24. Then the inversion flag 53 is set to 1 in ST 5, and the double screen flag 52 is set to 0 in ST 6. It can be judged from this output from the lid body sensor 17 whether the lid body 2 is in the double screen state or in the inverted state.

The above process is carried out only when the rotatable arm position flag 51 is 0, for the following reason. The rotatable arm position flag 51 is 1 when the lid body 2 is in the closed state and in the stacked state. Nonetheless, the information processing apparatus is not in use when the lid body 2 is in the closed state. Therefore, if the rotatable arm position flag 51 is 1, a judgement that the lid body 2 is in the stacked state creates no problems.

However, it can also be judged from this output from the lid body sensor 17 whether the lid body 2 is in the closed state or in the stacked state. If the rotatable arm position flag 51 is 1, and the A switch 24 is ON, the lid body 2 is in the closed state, whereas if the A switch 24 and the B switch 25 are both OFF, the lid body 2 is in the stacked state.

The following description will explain control of a display state and a lighting state in accordance with the states of the lid body 2. Inputting and editing operations with "Telephone Directory" will be described as an example. First, Telephone Directory is selected with the lid body 2 in the double screen state as shown in FIG. 3. As Telephone Directory is selected, information stored as a telephone directory is displayed on the lid body display section 4.

At first, the data item on the top of the lid body display section 4 is displayed in a black & white-reversed manner. As the name item "Yamada Ichiro" displayed on the lid body display section 4 is pen-touched, it is detected that the touched area is the location where "Yamada Ichiro" is being displayed, and the item area is displayed in a black & white-reversed manner as shown in FIG. 11(a). Then the RAM 34 is searched for detailed information about Mr. Yamada Ichiro, and personal data of Mr. Yamada Ichiro is displayed on the main body display section 3. For example, when "Address" is to be changed, the user pen-touches the "Address" input box, an item on the main body display section 3. The touched area is displayed in the same black & white-reversed manner, and an input area of the main body input section 7 is displayed on the main body display section 3 for new data to be inputted.

Figure 12:
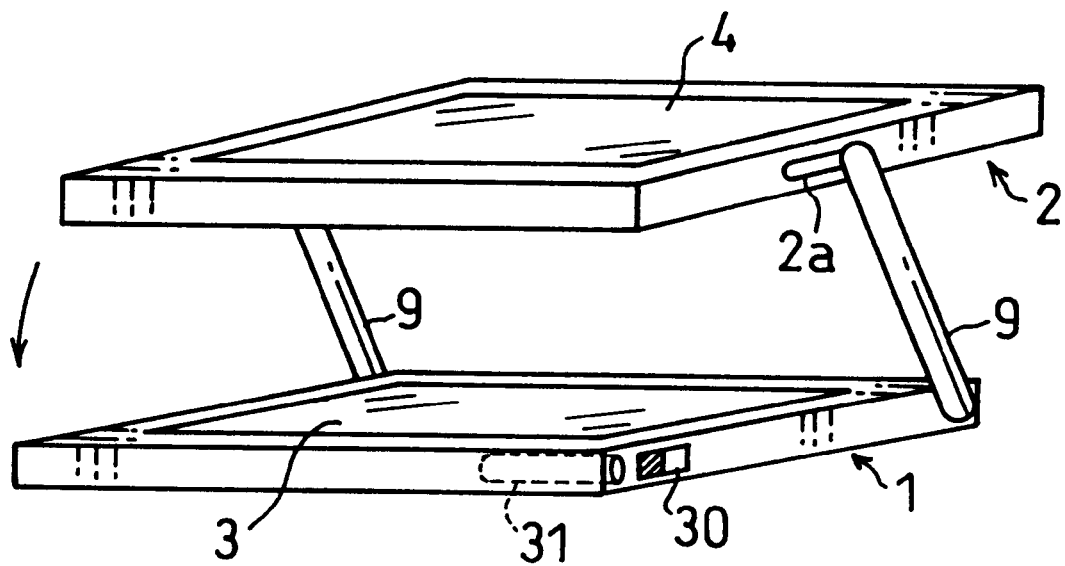
FIG. 12 a perspective view showing the lid body of the information processing apparatus shown in FIG. 3, which is being moved.

The following description will explain an operation for the lid body display section 4 to be stacked on the main body 1, i.e., for the lid body 2 to be moved to the stacked state. As shown in FIG. 12, a lower portion of the lid body 2 is lifted. As the lid body 2 has been moved to a horizontal level, the lid body 2 is placed onto the main body 1 together with the rotatable arm 9 to move into the stacked state shown in FIG. 5. The main control section 32 carries out control of changing into a single screen display according to the states of the rotatable arm position flag 51 representing the rotational position of the rotatable arm 9 and the states of the double screen flag 52 representing the position of the lid body 2.

Figure 13:
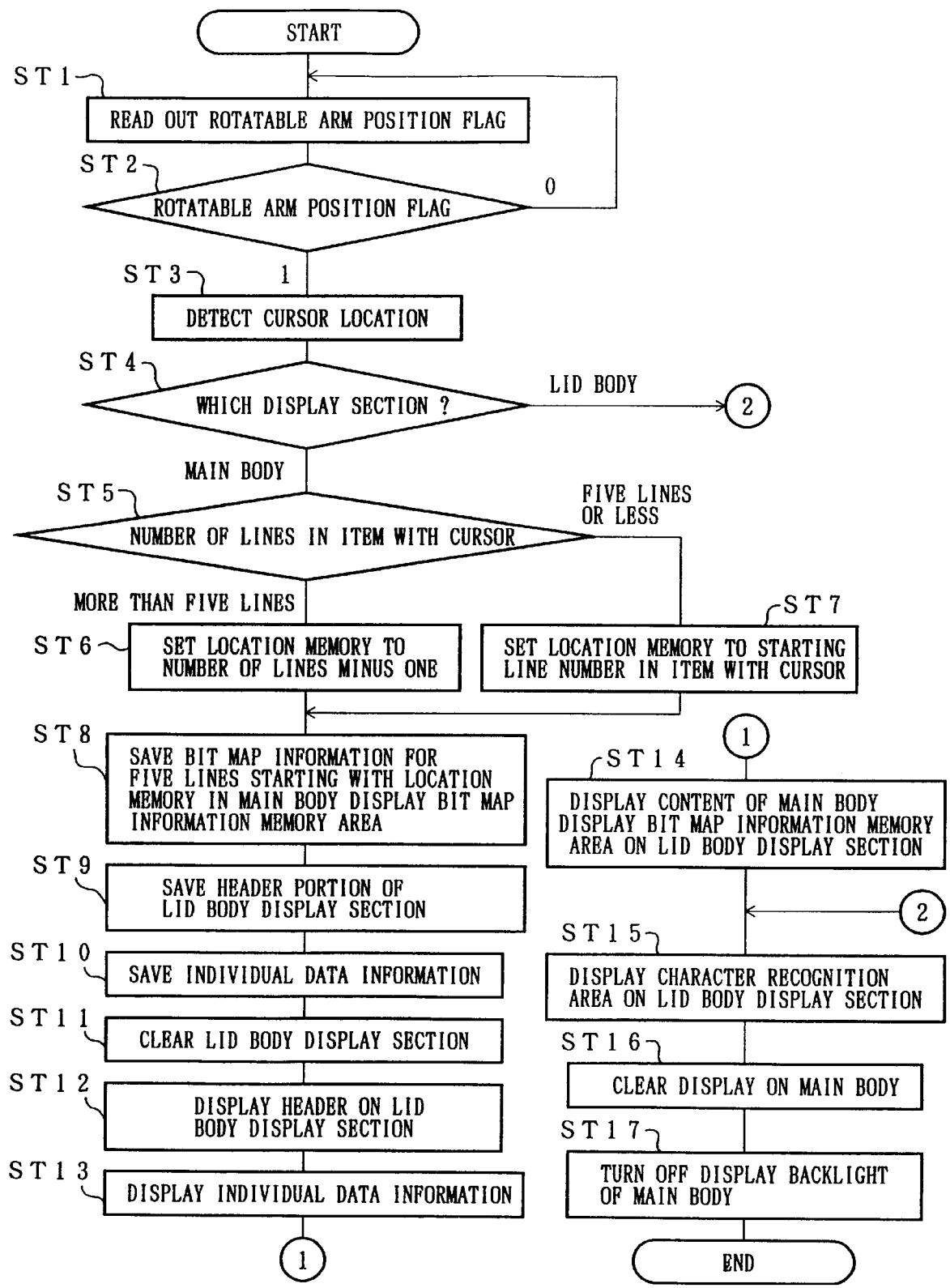
FIG. 13 is a flow chart showing control when the lid body is switched into the stacked state.

Referring to the flow chart in FIG. 13, the following description will explain detection of the lid body 2 in the stacked state and control after that detection. In ST 1 the rotatable arm position flag 51 is read out in order to detect that the lid body 2 is stacked on the main body 1. In ST 2 the content of the rotatable arm position flag 51 is judged: if the rotatable arm position flag 51 is 1, the process proceeds to ST 3, and if the rotatable arm position flag 51 is 0, the process returns to ST 1.

The cursor location is detected in ST 3, and it is judged in ST 4 whether the cursor is on the main body display section 3 or the lid body display section 4. If the cursor is on the main body display section 3, the process proceeds to ST 5. It is judged in ST 5 whether the item where the cursor is located includes more lines than the number of lines set for the character display of the main body display section 3. In this embodiment, the number of lines is set to five as an example. If the item where the cursor is located includes more than five lines, the process proceeds to ST 6, and the line number (1 or larger) of the line immediately before the line where the cursor is located is substituted in the memory of the location memory area 48. For example, if the cursor is in line 7 of the item where the cursor is located, "6" is substituted in the memory of the location memory area 48. However, if the cursor is in line 1 of the item where the cursor is located, "1" is substituted in the memory of the location memory area 48.

If the number of lines of the item where the cursor is located is five or less on the main body display section 3, the process proceeds to ST 7, and the starting line of the item where the cursor is located is substituted in the memory of the location memory area 48. This is a process for displaying all data in the item where the cursor is located if it is possible, and, otherwise, for starting the display with the preceding line so that the user can understand the context of the displayed data easily.

In ST 8 bit map information for five consecutive lines starting with the line substituted in the memory of the location memory area 48 is stored in the main body display bit map information memory area 45. In ST 9 a header portion 60 displayed on the lid body display section 4 is stored in the header memory area 49 of the RAM 34 so as to make it easier to understand which data is being displayed on the lid body 2. In ST 10 the first item of the data currently being displayed (item "Name" in this case) is stored in the individual data memory area 50.

In ST 11 the lid body display section 4 is cleared. In ST 12 the header portion 60 read out from the header memory area 49 is displayed on the lid body display section 4 as shown in FIG. 11(b). In ST 13 individual data 61 read out from the individual data memory area 50 is displayed, and in ST 14 display data 62 read out from the main body display bit map information memory area 45 is displayed. As the data is displayed, the process proceeds to ST 15. If it is judged in ST 4 that the cursor is on the lid body display section 4, the process proceeds to ST 15 without changing the display.

In this manner, when the cursor is on the main body display section 3, the information of the main body display section 3 is displayed on the lid body display section 4; when the cursor is on the lid body display section 4, the content of the lid body display section 4 is displayed without any change. In this manner, the information processing apparatus is made to give a priority to display of the display screen where the cursor is located. Note that regardless of the cursor location, a half of the lid body display section 4 may be used as a display area corresponding to the lid body display section 4 before stacking, and the other half as a display area corresponding to the main body display section 3 before stacking.

In ST 15 a character recognition area 63 where characters can be inputted is displayed below the lines displaying characters. This eliminates an operation of displaying the input area again, and thereby facilitates input. In ST 16 the display on the main body 1 is cleared, and in ST 17 the main body lighting section 5 of the main body 1 is turned off.

Figure 14:
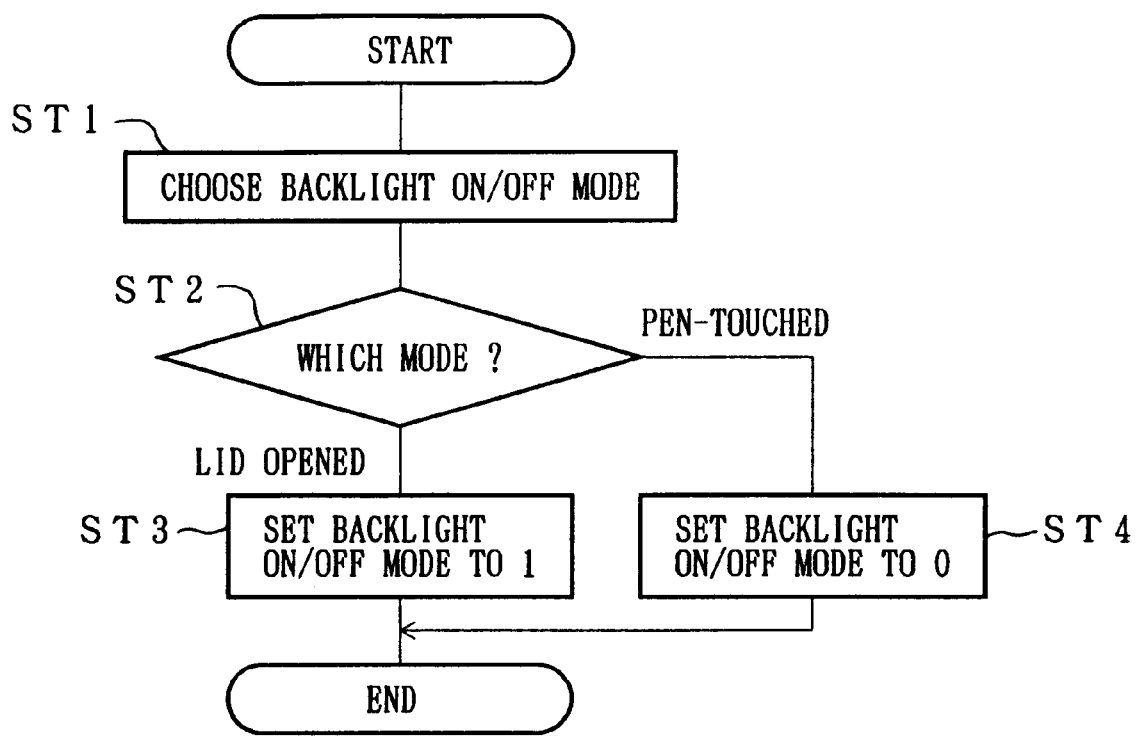
FIG. 14 is a flow chart showing a process of setting a backlight ON/OFF mode.

When the lid body 2 is moved back from the stacked state to the double screen state, as shown in FIG. 12, the lid body 2 is lifted and positioned normally to face the user. Here, choices can be made on the lighting state of the main body display section 3 according to needs. As shown in FIG. 14, to turn on the main body lighting section 5, a choice can be made in ST 1 between a mode to automatically turn it on when the user opens the lid body 2 and a mode to turn it on when the user pen-touches the main body display section 3. In ST 2 it is judged which mode has been chosen. The backlight ON/OFF mode flag 57 is set to 1 in ST 3 if the mode to automatically turn on the main body lighting section 5 upon opening of the lid body 2 has been chosen, whereas the backlight ON/OFF mode flag 57 is set to 0 in ST 4 if the mode to turn on the main body lighting section 5 upon a pen touch has been chosen. If the main body lighting section 5 is not to be turned on at all, a choice is made to chose neither of the two modes.

Figure 15:
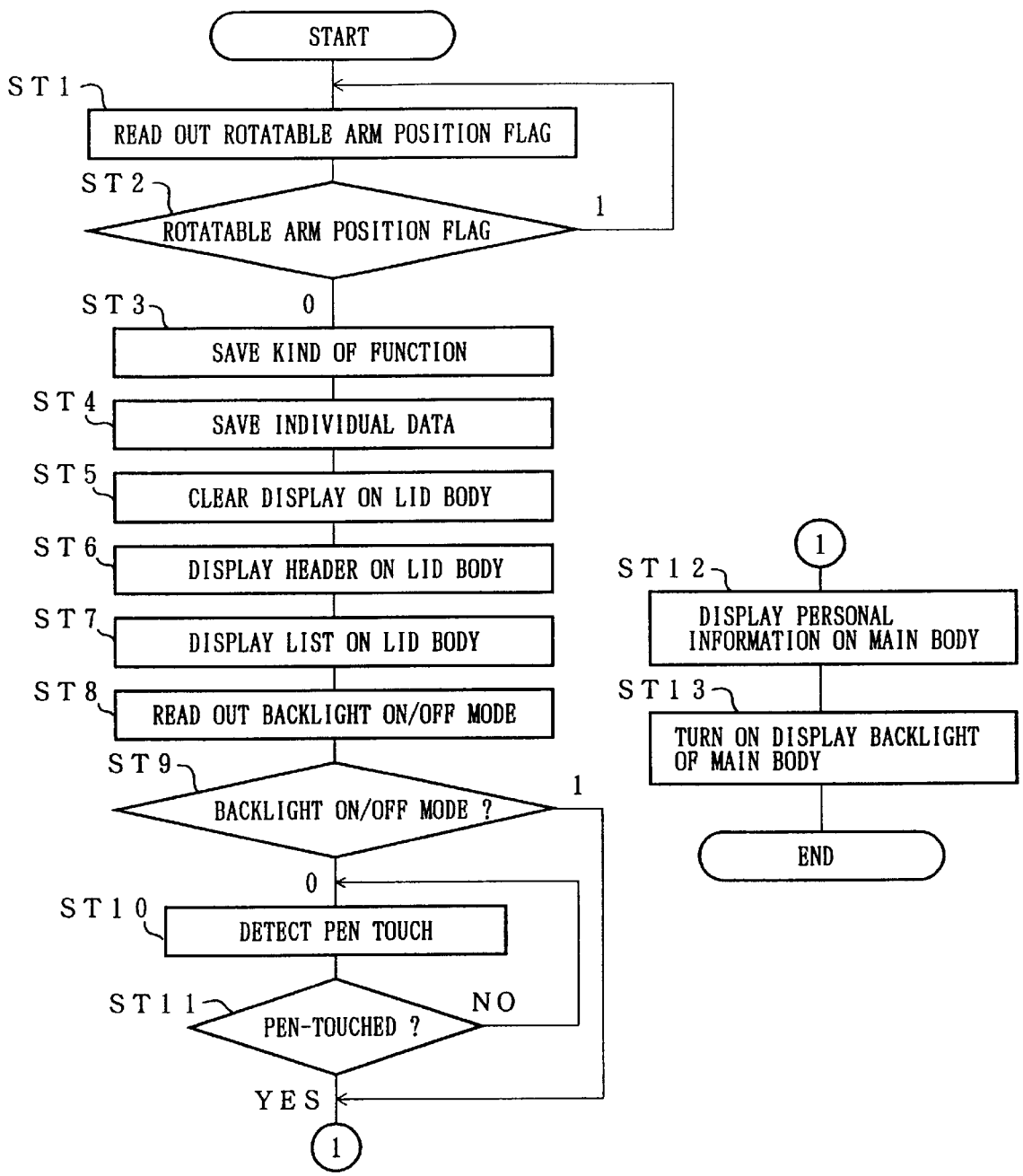
FIG. 15 is a flow chart showing control when the lid body changed its state from a single screen to double screens.

The display state is controlled at the same time with the lighting state control. Reference is made to the flow chart in FIG. 15 about an explanation of display control for controlling the turning-on of the main body lighting section 5 of the main body display section 3 in accordance with the backlight ON/OFF mode when the lid body 2 is moved from the stacked state to the double screen state.

In ST 1 the rotatable arm position flag 51 is read out, and in ST 2 the content of the rotatable arm position flag 51 is judged. If the rotatable arm position flag 51 is 1, the process returns to ST 1. If the rotatable arm position flag 51 is 0, the process proceeds to ST 3. In ST 3 the kind of function currently displayed on the lid body display section 4 is stored, and in ST 4 the data of the function currently displayed is stored. Here "Telephone Directory" is stored in ST 3, and the personal information of Mr. Yamada Ichiro is stored in ST 4.

In ST 5 the lid body display section 4 is cleared. Then in ST 6 a header portion is displayed in order to display data of Telephone Directory on the lid body display section 4. In ST 7 a content of the data of Telephone Directory is displayed under the header portion. In ST 8 the backlight ON/OFF mode flag 57 is read out, and it is judged whether the content of the backlight ON/OFF mode flag 57 is 1 or 0 in ST 9.

If the backlight ON/OFF mode flag 57 is 0, it is detected in ST 10 whether or not there has been a pen touch, and it is judged in ST 11 whether or not there has been a pen touch. In STs 10 and 11, the process does not proceed until there is a pen touch: the process proceeds to ST 12 only when there is a pen touch. If there is a pen touch in ST 11 or if the backlight ON/OFF mode flag 57 is 1, the personal information of Mr. Yamada Ichiro is displayed on the main body display section 3 in ST 12, and the main body lighting section 5 is turned on in ST 13.

If the lid body 2 is moved into the closed state with the power source switch 30 ON, heat cannot escape from the main body 1. Therefore, when it is detected that the lid body 2 has moved into the closed state, the main body lighting section 5 and the lid body lighting section 6 are automatically turned off. As the lid body 2 is opened again and the screen is visible, the main body lighting section 5 and the lid body lighting section 6 are turned on simultaneously. This can restraint heat generation and save power consumption.

The following description will demonstrate how the information processing apparatus is used in the inverted state, for example, when two persons sitting face-to-face have a meeting. The user has a necessary screen displayed on the lid body display section 4, and then positions the lid body 2 in the inverted state shown in FIG. 6 by rotating only the lid body 2 from the double screen state shown in FIG. 3. As to the rotation of the lid body 2, a lower portion of the lid body 2 is lifted, and the lid body 2 is turned around so that the lid body display section 4 faces the person sitting opposite to the user. Here, control for changing displays on the main body display section 3 and the lid body display section 4 is carried out in response to outputs from the main body sensor 16 and the lid body sensor 17.

Figure 16:
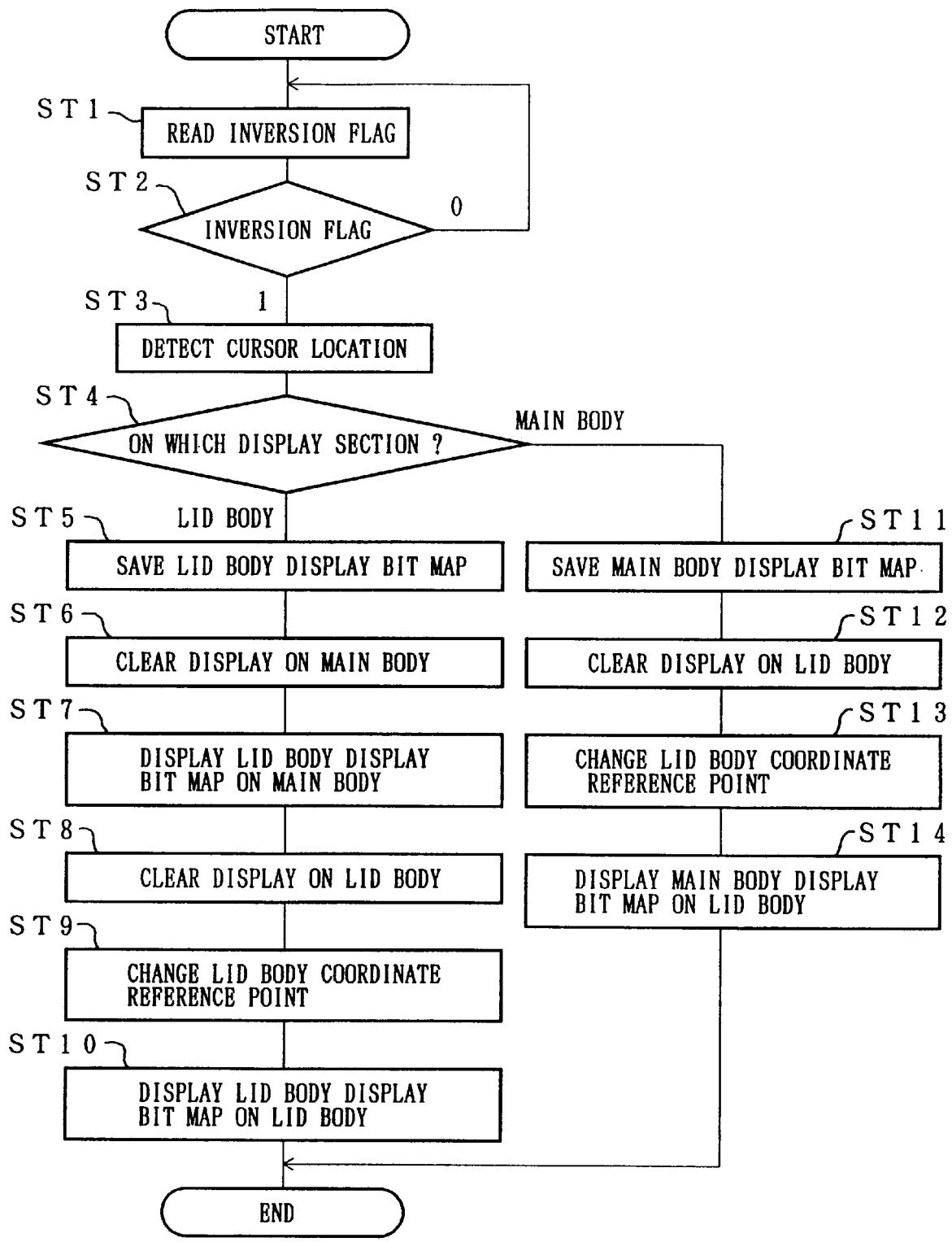
FIG. 16 is a flow chart showing control when the lid body is switched into the inverted state.

The lid body 2 in the inverted state is rotated so as to face the person sitting opposite to the user. FIG. 16 shows control when it is detected that the information processing apparatus is in the inverted state. In ST 1 the inversion flag 53 is read out. In ST 2 the content thereof is judged. If the inversion flag 53 of the RAM 34 is 1, the process proceeds to ST 3, whereas if the inversion flag 53 is 0, the process returns to ST 1. In ST 3 the cursor location is detected, and it is judged in ST 4 whether the cursor is on the main body display section 3 or on the lid body display section 4.

If the cursor is on the lid body display section 4, the lid body display bit map is saved in the lid body display bit map information memory area 46 of the RAM 34 in ST 5. Next, the main body display section 3 is cleared in ST 6, and a content of the lid body display bit map information memory area 46 is displayed on the main body display section 3 in ST 7. The lid body display section 4 is cleared in ST 8, and the lid body coordinate reference point is turned around by 180° from X to Y shown in FIG. 6 in ST 9. A content of the lid body display bit map information memory area 46 is displayed on the lid body display section 4 in ST 10.

If the cursor is on the main body display section 3 in ST 4, the main body display bit map is saved in the main body display bit map information memory area 45 of the RAM 34 in ST 11. Next, the lid body display section 4 is cleared in ST 12, the lid body coordinate reference point is changed from X to Y in ST 13, and then the content of the main body display bit map information memory area 45 is displayed on the lid body display section 4 in ST 14.

In this manner, when the lid body 2 is moved into the inverted state, information of the same content is displayed on the main body display section 3 and on the lid body display section 4, and the display of the information is turned upside down on the lid body display section 4, so that the person sitting opposite to the user can easily recognize the display.

Figure 17:
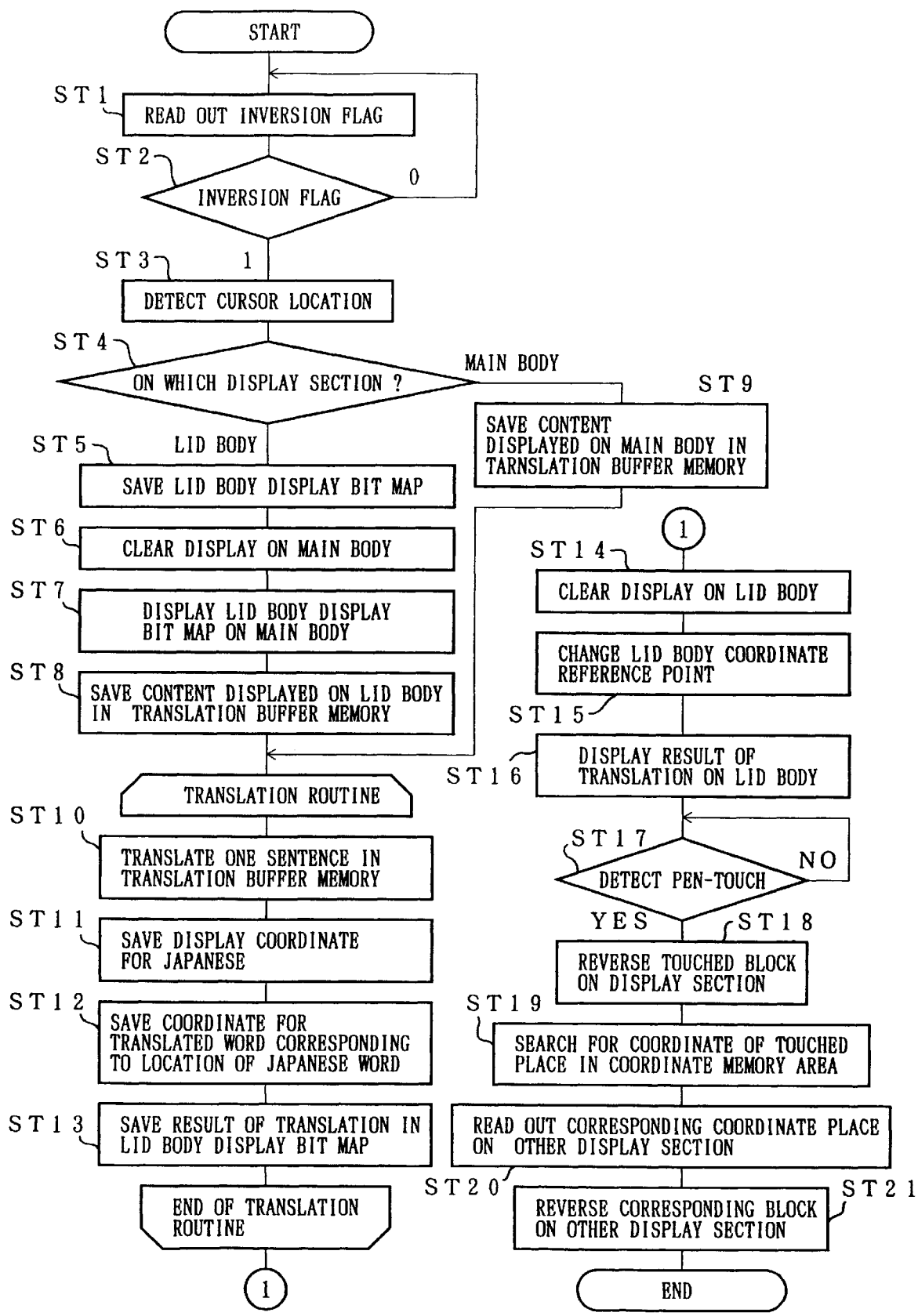
FIG. 17 is a flow chart showing control to translate Japanese into English, display both languages on respective display sections, and carry out a special display.

The following description will demonstrate how the information processing apparatus is used, for example, when two persons using different languages such as Japanese and English sit face-to-face and have a meeting using the translation function. The lid body 2 is positioned in the inverted state as already mentioned, and the user moves the cursor to the screen that is to be shown to the other person. The control here is illustrated in FIG. 17. STs 1 through 7 in FIG. 17 are the same procedure as STs 1 through 7 in FIG. 16.

Next, the content displayed on the lid body 2 is saved in the translation buffer memory 56 of the RAM 34 in ST 8. When the cursor is on the main body display section 3, the content displayed on the main body 1 saved in the translation buffer memory 56 of the RAM 34 in ST 9, and the process proceeds to a translation routine that starts with ST 10.

Figure 18:
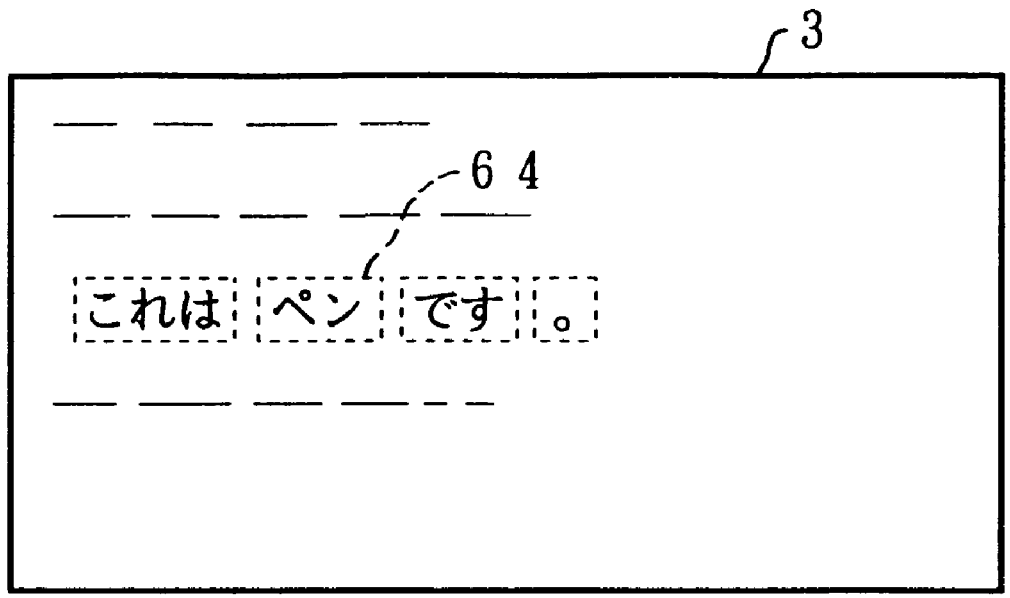
FIG. 18 (a) is a plan view showing a display screen of the main body display section when display is performed in the inverted state in both Japanese and English.
Figure 18:
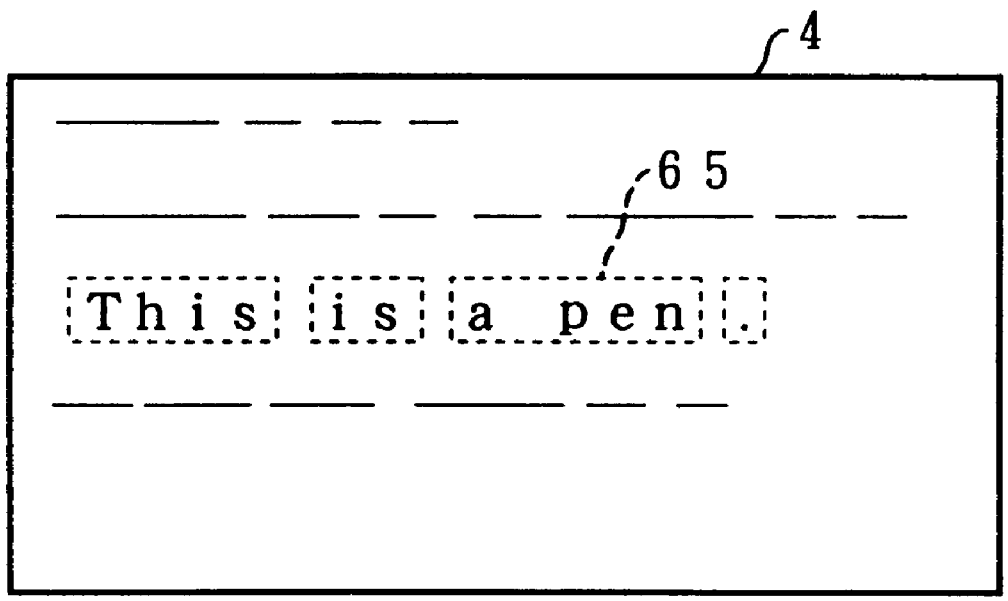

In ST 10, a sentence, that is a content of the translation buffer memory 56, is translated. At the same time, display coordinates of the words, included in the translated sentence, corresponding one-to-one to words included in the original sentence are made as a table. For example, a Japanese sentence, "これはペンです。", in FIG. 18(a) is translated into an English sentence, "This is a pen."

In ST 11 a Japanese display coordinate is saved in the coordinate memory area 55 of the RAM 34. In ST 12 an English display coordinate is saved in the coordinate memory area 55 of the RAM 34 correspondingly to the Japanese display coordinate. In ST 13 a result of the translation is saved in the lid body display bit map information memory area 46. STs 10 through 13 are repeated until the whole sentence is translated and all the coordinates corresponding to the words are saved.

After the translation routine, in ST 14 the lid body display section 4 is cleared, and in ST 15 the lid body coordinate reference point is changed from X to Y. In ST 16 the content of the lid body display bit map information memory area 46 is displayed on the lid body display section 4. Consequently, a Japanese sentence is displayed on the main body display section 3, and the English sentence translated from the Japanese is displayed on the lid body display section 4 in a reversed manner.

In ST 17 and thereafter, a process is carried out for a case when either the main body display section 3 or the lid body display section 4 is pen-touched. In ST 17 the pen-touch is detected: for example, when the location of "ペン (a pen)" is detected, a special display is carried out in ST 18 so that the block 64 (see FIG. 18(a)) for "ペン" on the main body display section 3 is displayed in a reversed or flickering manner. Next, in ST 19 the coordinate memory area 55 of the RAM 34 is searched for the block coordinate of "ペン", and in ST 20 the coordinate location on the corresponding lid body display section 4 is read out. Since the coordinate location on the corresponding lid body display section 4 is the block 65 (see FIG. 18(b)) for "a pen", a special display is carried out in ST 21 so that the block 65 for "a pen" on the lid body display section 4 is displayed in a reversed or flickering manner. The same kind of arrangement for a special display of, for example, displaying the block 64 for "ペン" on the main body display section 3 in a reversed manner is possible, also when the block 65 for "a pen" on the lid body display section 4 is touched.

As mentioned so far, appropriate display and lighting states can be obtained with the information processing apparatus of the present embodiment in accordance to the states of the lid body 2. That is, when the lid body 2 is in the stacked state, the lighting for the main body display section 3 is OFF; when the lid body 2 is in the double screen state, the lighting for the main body display section 3 can be automatically turned on upon opening of the lid body 2 or touching to the main body display section 3. This can save power consumption of the information processing apparatus and eliminate a need for an input operation through the main body display section 3 whose lighting is OFF and which is therefore hard to see, thus improving operability. Additionally, this can prevent heat from being accumulated in the main body display section 3, thereby protecting the main body display section 3 and the lid body display section 4 from heat.

Also, when the lid body 2 is in the stacked state, the information processing apparatus can give a priority to information of either the main body display section 3 or the lid body display section 4 which includes the cursor and automatically display all that information on the lid body display section 4. This, even when the main body display section 3 is being used for an input operation, eliminates a need for an operation of scrolling the cursor from an input position of the main body display section 3 onto the lid body display section 4. Therefore, even when display on the main body display section 3 and the lid body display section 4 is changed, the input position can be shown clearly, thereby offering a user-friendly display environment.

Here, instead of displaying all information on either the main body display section 3 or the lid body display section 4 which includes the cursor, only information near the cursor may be displayed on a part of the lid body display section 4, and a part of information displayed on the lid body display section 4 is displayed on the rest of the lid body display section 4. This makes it possible to confirm the content displayed on the main body 1 even when switched from the double screen state to the stacked state, preventing confusion. In addition, displaying the character recognition area on the lid body display section 4 facilitates input.

When the lid body 2 is in the inverted state, it is possible to carry out display which can be easily recognized by a person sitting opposite the user, by displaying information of the same content on the lid body display section 4 as well as on the main body display section 3 and turning the display of the lid body display section 4 upside down. The user can easily make a presentation to the other person only by moving the lid body 2 into the inverted state. The two persons can talk to each other while looking at the right information on the respective screens, by inputting an instruction through one of the main body display section 3 and the lid body display section 4, and carrying out, on the other display section, a special display at the location (second location) corresponding to the location (first location) at which the instruction is made. This enhances usability of the information processing apparatus.

Figure 19A:
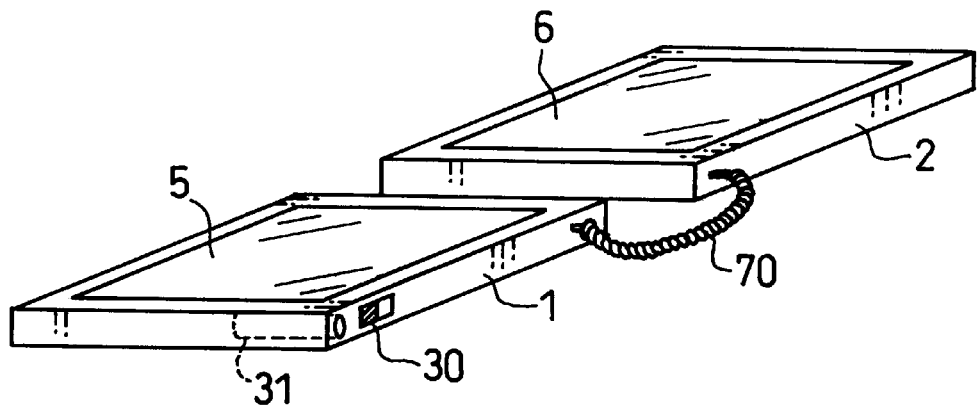
FIG. 19(a), illustrating another embodiment of an information processing apparatus in accordance with the present invention, is a perspective view showing an appearance of the information processing apparatus.
Figure 19B:
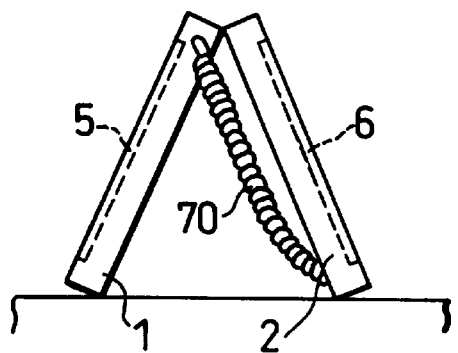
FIG. 19(b) is a side view showing an appearance of the information processing apparatus in the inverted state.
Figure 19C:
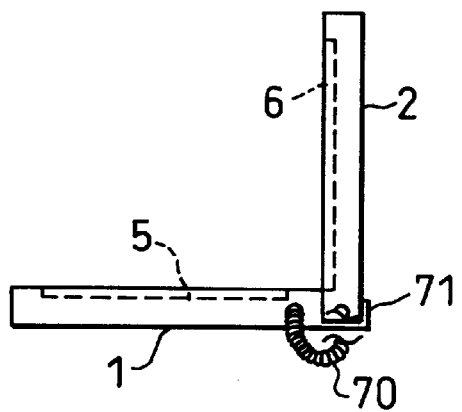
FIG. 19(c) is a side view showing an appearance of the information processing apparatus in the double screen state.

When the same information is displayed on the user's side and on the other person's side in different languages of totally different grammars such as Japanese and English, an original word and its translated word are not displayed at the same location on the respective sides, creating an obstacle in communication. Supposing that either the display on the user's side or the display on the other person's side is in Japanese and the display on the opposite side thereof is in another language, the information processing apparatus can carry out display which is easily understood by a person who does not understand Japanese, by displaying information of the same content on the display sections in different languages and carrying out, on one of the display sections, a special display at the location corresponding to the location on the other display section at which an instruction is inputted. This enables smooth communication between people of different mother languages and enhances usability of the information processing apparatus. As shown in FIGS. 19(a) through 19(c), the main body 1 and the lid body 2 may be connected with a flexible cord 70, such as a curled cord, as connecting means. Since the lid body 2 can be freely change its relative position to the main body 1, the user can correctly show the display to a person opposite him/her with the lid body 2 in the inverted state as shown in FIG. 19(b), by simply inverting the lid body 2 without inverting the display on the screen. Of course, control of inverting the display on the screen without inverting the lid body 2 is also possible.

When switching to the double screen state, a support table 71 equipped inside the main body 1 is rotated and taken out, and then the lid body 2 is erected on the support table 71 as shown in FIG. 19(c). As to the stacked state, link means such as a protrusion and a claw fix the lid body 2 to the main body 1. Although the present invention have been described in the present embodiment with respect to an information processing apparatus having two screens as an example, the present invention can also be applied to an information processing apparatus having three or more screens.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An information processing apparatus including a main body and a lid body, each of the main body and the lid body having a display section for displaying information and a lighting section for lighting the display section, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a lighting state of the lighting section of the main body and a lighting state of the lighting section of the lid body according to a result detected by said lid body detecting means;

wherein if said lid body detecting means detects that the lid body is in the stacked state, said control means controls so that the lighting section of the main body goes into an OFF state.

2. An information processing apparatus as defined in claim 1, said information processing apparatus further comprising:

input means, composed of a transparent tablet, for allowing pen input and touch input on the display section of the main body and on the display section of the lid body;

location detecting means for detecting a first location, on one of the display sections, at which an instruction is inputted through said input means; and means for controlling, when said lid body is in the inverted state, so that a second location, on the other display section, corresponding to the first location is displayed in a special manner.

3. The information processing apparatus as defined in claim 2, further comprising translation means for translating a first language to a second language, wherein the first and second languages are displayed on the respective display sections, and said control means controls so that a word having the same meaning with a word at the first location is displayed in a special manner.

4. An information processing apparatus including a main body and a lid body, each of the main body and the lid body having a display section for displaying information and a lighting section for lighting the display section, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a lighting state of the lighting section of the main body and a lighting state of the lighting section of the lid body according to a result detected by said lid body detecting means;

wherein if said lid body detecting means detects that the lid body has been switched into the double screen state, said control means controls so that the lighting section of the display section of the main body goes into an ON state.

5. An information processing apparatus including a main body and a lid body, each of the main body and the lid body having a display section for displaying information and a lighting section for lighting the display section, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a lighting state of the lighting section of the main body and a lighting state of the lighting section of the lid body according to a result detected by said lid body detecting means;

wherein if said lid body detecting means detects that the lid body has been switched into the double screen state, and input is made through said input means, said control means controls so that the lighting section of the display section of the main body goes into an ON state.

6. The information processing apparatus as defined in claim 5, further comprising input means composed of a transparent tablet, provided on the display section of the main body and on the display section of the lid body.

7. An information processing apparatus including a main body and a lid body, each of the main body and the lid body having a display section for displaying information, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a display state of the display section of the main body and a display state of the display section of the lid body according to a result detected by said lid body detecting means;

wherein if said lid body detecting means detects that the lid body has been switched into the stacked state, said control means controls so that information displayed on the display section of the main body is displayed on a part of the display section of the lid body section.

8. The information processing apparatus as defined in claim 7, further comprising input means composed of a transparent tablet, provided on the display section of the main body and on the display section of the lid body.

9. An information processing apparatus including a main body and a lid body, each of the main body and the lid body having a display section for displaying information, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a display state of the display section of the main body and a display state of the display section of the lid body according to a result detected by said lid body detecting means;

cursor location detecting means for detecting a location of a cursor, wherein if said lid body detecting means detects that the lid body is in the stacked state, said control means controls so that information of one of the display sections where presence of the cursor is detected by said cursor location detecting means is displayed on the display section of the lid body section.

10. An information processing apparatus including a main body and a lid body, each of the main body and the lid body having a display section for displaying information, said information processing apparatus comprising:

connecting means for connecting the lid body to the main body so that the lid body can be switched between three states: a closed state where the lid body serves as a lid to cover the main body with the display section of the lid body facing downward, a stacked state where the lid body is stacked on the main body with the display section of the lid body facing upward, and a double screen state where both the display sections are visible;

lid body detecting means for detecting in which of the three states the lid body is; and control means for controlling a display state of the display section of the main body and a display state of the display section of the lid body according to a result detected by said lid body detecting means;

wherein if said lid body detecting means detects that the lid body has been switched into the stacked state, said control means displays on the display section of the lid body a character recognition area through which a character can be inputted.

11. An information processing apparatus including a main body and a lid body, each of the main body and the lid body having a display section for displaying information, said information processing apparatus comprising:

connecting means for connecting the lid body to the main body so that the lid body can be switched into an inverted state where the display section of the main body is visible and the display section of the lid body is inverted on the backside of the main body;

lid body detecting means for detecting that the lid body is in the inverted state; and control means for, when said lid body detecting means detects that the lid body is in the inverted state, controlling so that the display section of the main body and the display section of the lid body display the same information and so that the display section of the lid body displays the information upside down.

12. The information processing apparatus as defined in claim 11, further comprising input means composed of a transparent tablet, provided on the display section of the main body and on the display section of the lid body.

13. The information processing apparatus as defined in claim 12, further comprising location detecting means for detecting a first location, on one of the display sections, at which an instruction is inputted through said input means, wherein said control means controls so that a second location, on the other display section, corresponding to the first location is displayed in a special manner.

14. The information processing apparatus as defined in claim 13, further comprising translation means for translating a first language to a second language, wherein the first and second languages are displayed on the respective display sections, and said control means controls so that a word having the same meaning with a word at the first location is displayed in a special manner.

* * * * *